US012685243B2

(12) United States Patent
Schroeder

(10) Patent No.: US 12,685,243 B2
(45) Date of Patent: Jul. 21, 2026

(54) SYSTEMS AND METHODS FOR MONITORING DISC CONDITIONS OF AGRICULTURAL IMPLEMENTS USING DISTANCE-BASED MEASUREMENTS

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 947 days.

(21) Appl. No.: 17/828,222

(22) Filed: May 31, 2022

(65) Prior Publication Data

US 2023/0380326 A1 Nov. 30, 2023

(51) Int. Cl.
  *G01S 17/08* (2006.01)
  *A01B 79/00* (2006.01)

(52) U.S. Cl.
  CPC ............ *A01B 79/005* (2013.01); *G01S 17/08* (2013.01)

(58) Field of Classification Search
  None
  See application file for complete search history.

(56) References Cited

U.S. PATENT DOCUMENTS

| | | | |
|---|---|---|---|
| 6,990,390 | B2 | 1/2006 | Groth et al. |
| 10,939,604 | B2 | 3/2021 | Sporrer et al. |
| 11,191,202 | B2 | 12/2021 | Henry |
| 11,234,355 | B2 | 2/2022 | Smith et al. |
| 11,655,617 | B2 * | 5/2023 | Harnetiaux .......... A01B 33/087 |
| | | | 701/34.4 |
| 2020/0340215 | A1 | 10/2020 | Harnetiaux |
| 2020/0352081 | A1 | 11/2020 | Arnett et al. |
| 2020/0359541 | A1 * | 11/2020 | Ptacek ................. A01B 63/008 |
| 2020/0390024 | A1 * | 12/2020 | Naylor ................... G01S 17/87 |
| 2021/0100154 | A1 | 4/2021 | Henry |
| 2021/0136990 | A1 | 5/2021 | Henry et al. |
| 2022/0261007 | A1 * | 8/2022 | Kraus .................... A01D 59/04 |

FOREIGN PATENT DOCUMENTS

DE 102017112224 A1 12/2018

OTHER PUBLICATIONS

The Big Bearing Store, "Identifying Disc Harrow Problems," Carnell Sales, Inc., Oct. 1, 2015 (2 pages) https://thebigbearingstore.com/blog/identifying-disc-harrow-problems/.

* cited by examiner

*Primary Examiner* — Adam D Tissot
*Assistant Examiner* — Laura E Linhardt
(74) *Attorney, Agent, or Firm* — Dority & Manning, P.A.

(57) ABSTRACT

In one aspect, a system for monitoring disc conditions of an agricultural implement includes a disc configured to penetrate through a soil surface during the performance of an agricultural operation, and a distance sensor configured to generate data associated with a distance defined between the distance sensor and a portion of the disc. In addition, the system includes a computing system communicatively coupled with the distance sensor. The computing system is configured to monitor the distance defined between the distance sensor and the disc based on the data received from the distance sensor, and detect a pattern in the monitored distance over time that is associated with at least one of a damage pattern or a missing disc pattern.

20 Claims, 6 Drawing Sheets

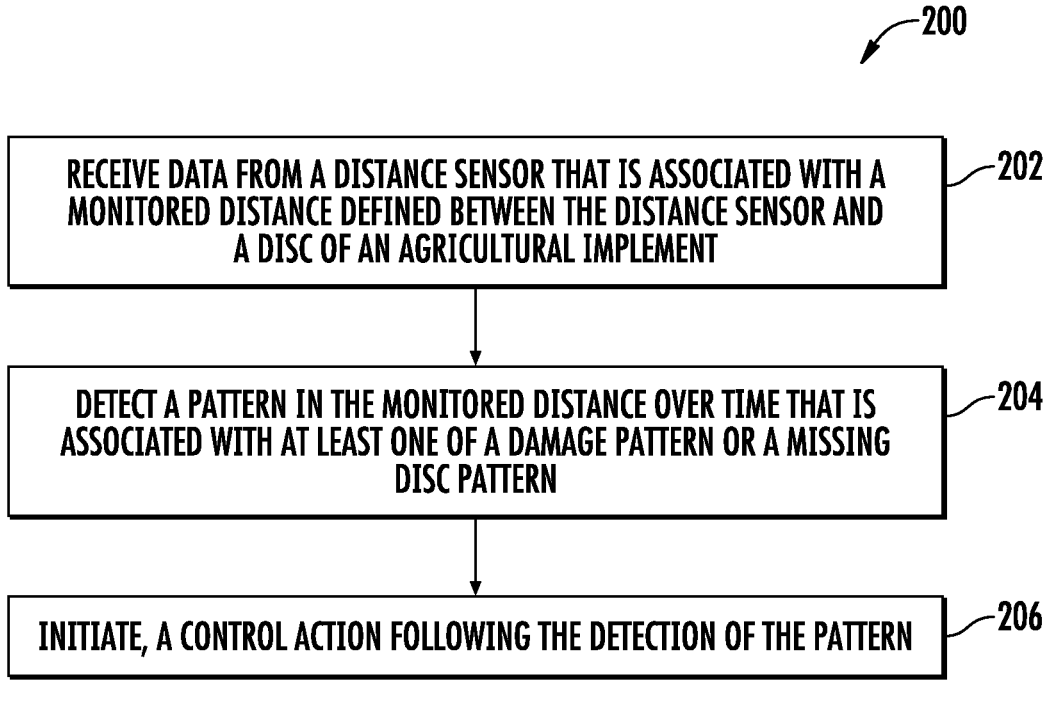

_200_

RECEIVE DATA FROM A DISTANCE SENSOR THAT IS ASSOCIATED WITH A MONITORED DISTANCE DEFINED BETWEEN THE DISTANCE SENSOR AND A DISC OF AN AGRICULTURAL IMPLEMENT ⟋202

DETECT A PATTERN IN THE MONITORED DISTANCE OVER TIME THAT IS ASSOCIATED WITH AT LEAST ONE OF A DAMAGE PATTERN OR A MISSING DISC PATTERN ⟋204

INITIATE, A CONTROL ACTION FOLLOWING THE DETECTION OF THE PATTERN ⟋206

FIG. 6

SYSTEMS AND METHODS FOR MONITORING DISC CONDITIONS OF AGRICULTURAL IMPLEMENTS USING DISTANCE-BASED MEASUREMENTS

FIELD OF THE INVENTION

The present disclosure generally relates to agricultural implements and, more particularly, to systems and methods for detecting the condition of discs of an agricultural implement using distance-based measurements.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more tool assemblies configured to engage the soil as the implement is moved across the field. For example, in certain configurations, the implement may include one or more disc gang assemblies, leveling disc assemblies, rolling basket assemblies, shank assemblies, and/or the like. Such tool assemblies loosen and/or otherwise agitate the soil to prepare the field for subsequent planting operations.

Due to the nature of the operation being performed within a field, the rotating discs often become damaged. For instance, contact with rocks or other objects within the field can cause a disc to become bent or even broken. Additionally, in certain instances, a disc will fall off or otherwise become decoupled from the remainder of the implement. Such damaged or missing discs can result in the operation of the agricultural implement being rendered ineffective or unsuitable for performing its intended function. However, it is typically quite difficult for an operator to determine when a disc is damaged or missing, particularly during the performance of an active agricultural operation within the field.

Accordingly, a system and related method monitoring the condition of discs of an agricultural implement (e.g., conditions associated with damaged or missing discs) would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring disc conditions of an agricultural implement. The system includes a disc configured to penetrate through a soil surface during the performance of an agricultural operation, and a distance sensor configured to generate data associated with a distance defined between the distance sensor and a portion of the disc. In addition, the system includes a computing system communicatively coupled with the distance sensor. The computing system is configured to monitor the distance defined between the distance sensor and the disc based on the data received from the distance sensor, and detect a pattern in the monitored distance over time that is associated with at least one of a damage pattern or a missing disc pattern. The damage pattern is indicative of a damaged condition of the disc and is characterized by a cyclical variation in the monitored distance over time. The missing disc pattern is indicative of the disc no longer being present within a field of view of the distance sensor.

In another aspect, the present subject matter is directed to a system for monitoring disc conditions of agricultural implements. The system includes an agricultural implement configured to perform an agricultural operation, with the agricultural implement including a frame and a plurality of discs supported relative to the frame. The system also includes a distance sensor supported relative to the agricultural implement and being configured to generate data associated with a distance defined between the distance sensor and a portion of at least one disc of the plurality of discs. Additionally, the system includes a computing system communicatively coupled with the distance sensor. The computing system is configured to monitor the distance defined between the distance sensor and the at least one disc based on the data received from the distance sensor, and detect a pattern in the monitored distance over time that is associated with at least one of a damage pattern or a missing disc pattern. The damage pattern is indicative of a damaged condition of the at least one disc and is characterized by a cyclical variation in the monitored distance over time. The missing disc pattern is indicative of the at least one disc no longer being present within a field of view of the distance sensor.

In a further aspect, the present subject matter is directed to a method for monitoring disc conditions of an agricultural implement. The method includes receiving, with a computing system, data from a distance sensor that is associated with a monitored distance defined between the distance sensor and a disc of the agricultural implement, the disc being configured to penetrate through a soil surface during the performance of an agricultural operation. The method also include detecting, with the computing system, a pattern in the monitored distance over time that is associated with at least one of a damage pattern or a missing disc pattern. The damage pattern is indicative of a damaged condition of the disc and being characterized by a cyclical variation in the monitored distance over time. The missing disc pattern is indicative of the at least one disc no longer being present within a field of view of the distance sensor. Additionally, the method includes initiating, with the computing system, a control action following the detection of the pattern.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates a flow diagram of one embodiment of a method for monitoring disc conditions of an agricultural implement in accordance with aspects of the present subject matter.

Figure 1:
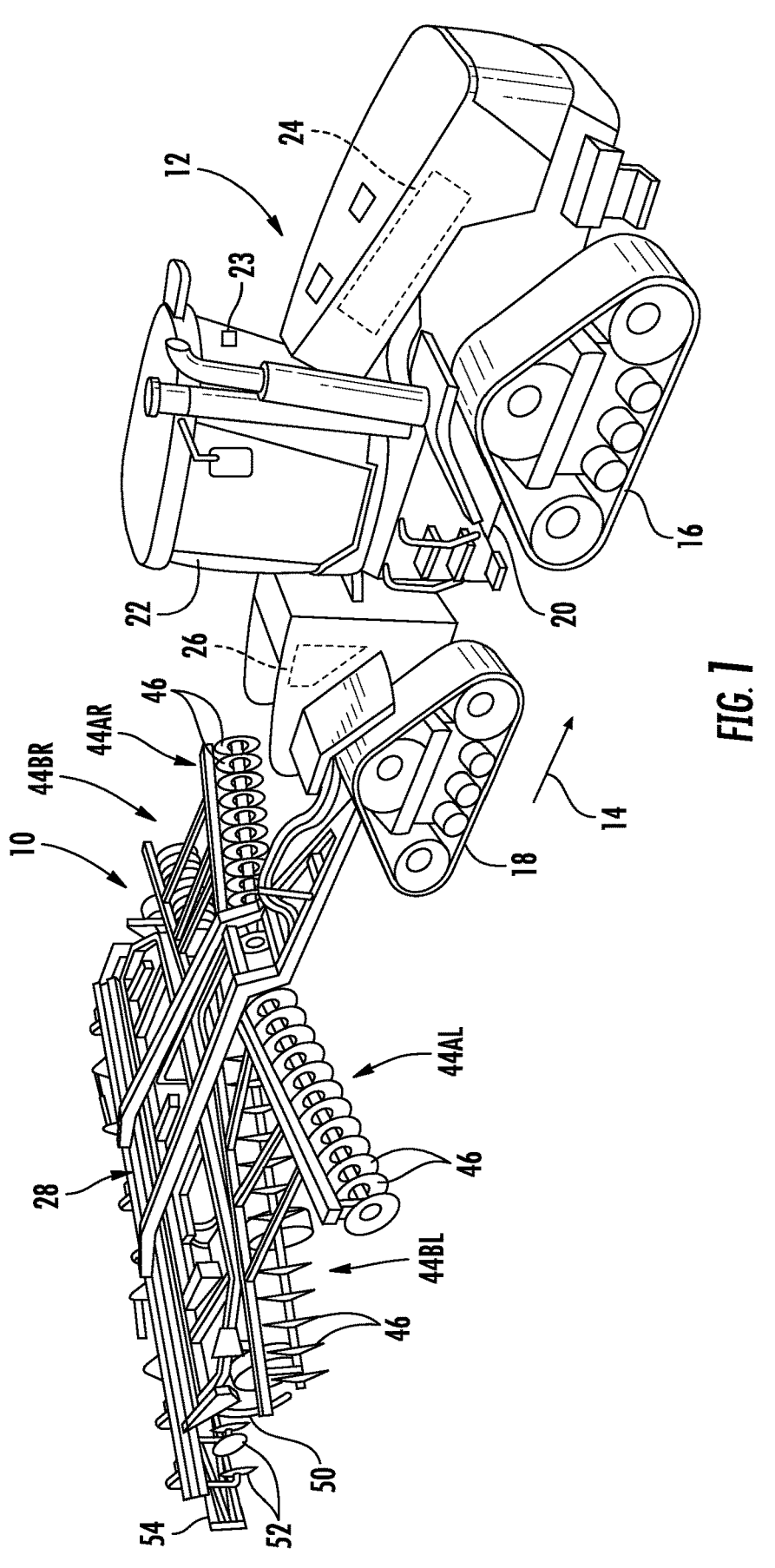
FIG. 1 illustrates a perspective view of one embodiment of an agricultural implement in accordance with aspects of the present subject matter, particularly illustrating the implement being towed by a work vehicle.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for monitoring the condition of discs of an agricultural implement. In several embodiments, a distance sensor may be supported relative to the implement such that the distance sensor has a field of view directed toward a portion of one or more discs of the implement (e.g., toward a portion of an outer perimeter of the disc(s), such as the cutting or working edge of the disc(s)). A computing system may be configured to monitor the measured distance between the sensor and the disc(s) based on the distance-related data received form the sensor to allow the computing system to detect when a change in the measured distance over time is indicative of either a damage pattern or a missing disc pattern. Specifically, as will be described below, when the distance data received from the distance sensor indicates that the measured distance is exhibiting a given cyclical or repeating pattern indicative of a damage pattern for the disc(s), the computing system may determine that the disc(s) has a damaged condition or is otherwise damaged (e.g., bent or broken). Alternatively, when the distance data received from the distance sensor indicates that the disc(s) is no longer within the field of view of the sensor, the computing system may determine that the disc(s) has fallen off or otherwise become decoupled from the implement (i.e., the disc is missing). Based on the determination of the current operating condition of the monitored disc(s), the computing system may be configured to initiate a control action, such as by generating an operator notification or by adjusting the operation of the implement when it is determined that the disc(s) is damaged or missing.

It should be appreciated that, although the present subject matter will generally be described herein with reference to discs of a disc gang assembly, the disclosed systems and methods can also be applied to individually mounted or non-ganged discs. Moreover, even though the present subject matter will generally be described herein with reference to discs of a tillage implement, the disclosed systems and methods can also be applied to discs of any other suitable agricultural implement, such as opener discs or closing discs of a planting implement or any other suitable disc or discs forming part of a given agricultural implement.

Figure 2:
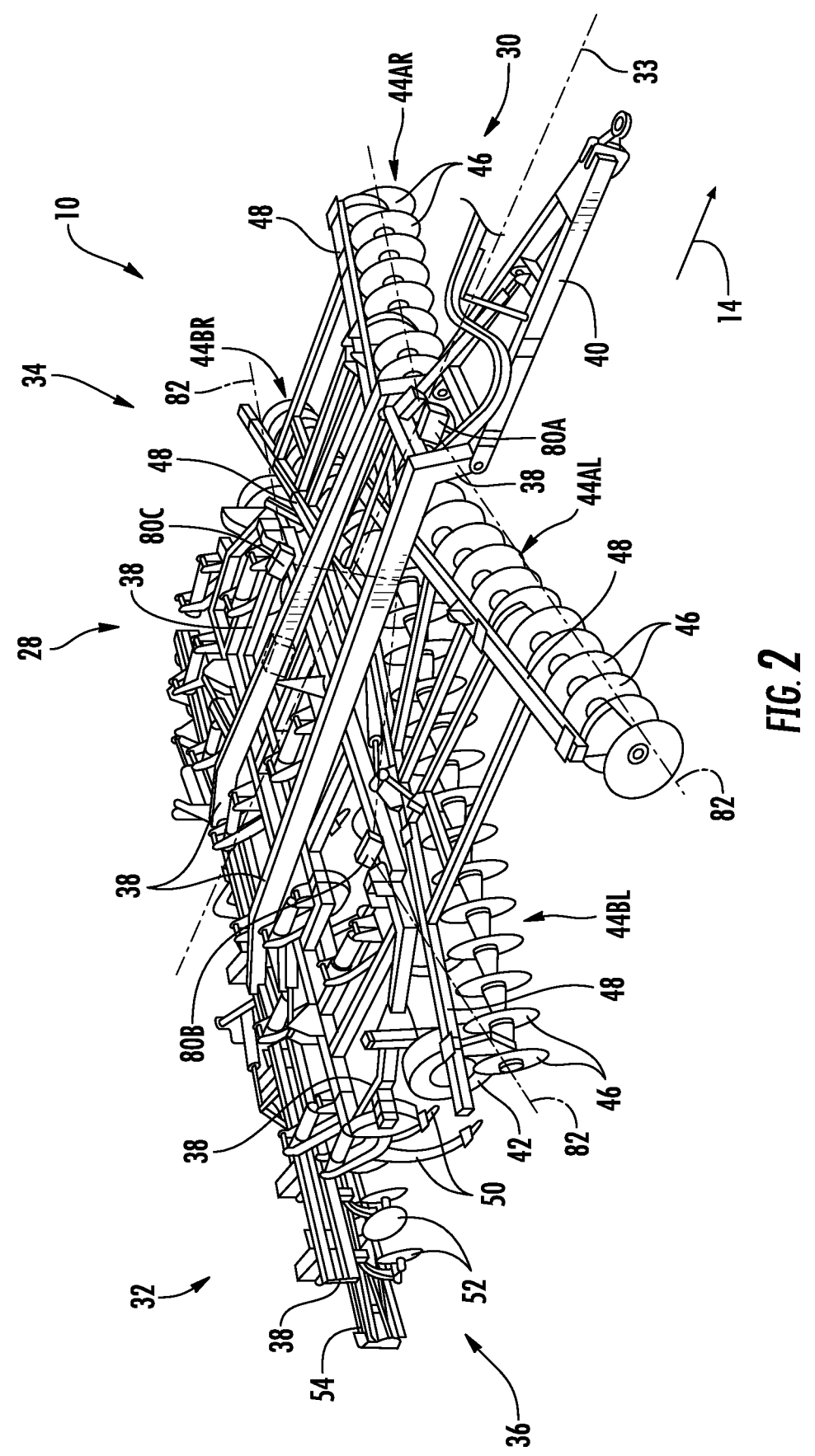
FIG. 2 illustrates another perspective view of the agricultural implement shown in FIG. 1 in accordance with aspects of the present subject matter, particularly illustrating the implement including one or more embodiments of distance sensors installed relative thereto for monitoring sensor-to-disc distances between each sensor and one or more discs of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair of rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices (e.g., a user interface 23) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first lateral side 34 (e.g., a right side of the implement 10) and a second lateral side 36 (e.g., a left side of the implement 10), with a longitudinal centerline 33 of the implement frame 28 extending in the longitudinal direction between the forward and aft ends 30, 32 and generally dividing the first lateral side 34 from the second lateral side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, the frame 28 may be configured to support various ground-engaging tool assemblies. For instance, the frame 28 may support one or more disc gang assemblies 44. As illustrated in FIG. 2, each disc gang assembly 44 includes a toolbar 48 coupled to the implement frame 28 and a plurality of harrow discs 46 supported by the toolbar 48 relative to the implement frame 28. Each harrow disc 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported relative to the frame 28 at a location forward of the remainder of the ground-engaging tools. Specifically, the implement 10 includes a pair of front disc gang assemblies 44A (e.g., a left front disc gang assembly 44AL and a right front disc gang assembly 44AR) and a pair of rear disc gang assemblies 44B (e.g., a left rear disc gang assembly 44BL and a right rear disc gang assembly 44BR) positioned aft or rearward of the front disc gang assemblies 44A relative to the direction of travel 14 of the implement 10, with the right-side disc gang assemblies 44AR, 44BR being positioned on the right or first lateral side 34 of the implement 10 and the left-side disc gang assemblies 44AL, 44BL being positioned on the left or second lateral side 36 of the implement 10. It should be appreciated that, in alternative embodiments, the implement 10 may include any other suitable number of disc gang assemblies 44, such as more or less than four disc gang assemblies 44. Furthermore, in one embodiment, the disc gang assemblies 44 may be mounted to the frame 28 at any other suitable location, such as adjacent to its aft end 32.

Additionally, as shown, in one embodiment, the implement frame 28 may be configured to support other ground-engaging tool assemblies. For instance, in the illustrated embodiment, the frame 28 is configured to support a plurality of shank assemblies 50 configured to rip or otherwise till the soil as the implement 10 is towed across the field. Furthermore, in the illustrated embodiment, the frame 28 is also configured to support one or more finishing tool assemblies, such as a plurality of leveler disc assemblies 52 and/or rolling (or crumbler) basket assemblies 54. However, in other embodiments, any other suitable ground-engaging tool assemblies may be coupled to and supported by the implement frame 28, such as a plurality of closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration. For instance, in another embodiment, as opposed to disc gang assemblies, the discs 46 may be individually mounted or supported relative to the frame 28. Additionally, in one embodiment, the implement 10 may be configured as a disc harrow that only includes discs 46 without any additional ground-engaging tools.

Referring still to FIGS. 1 and 2, in several embodiments, the implement 10 may also have one or more distance sensors 80 supported relative thereto. Specifically, the distance sensor(s) 80 may be configured to be supported by or relative to the frame 28 such that each sensor 80 has a field of view 82 directed towards a portion of one or more of the discs 46 of the implement 10. In general, the distance sensor(s) 80 may be configured to generate distance-related data associated with the distance defined between the sensor(s) 80 and one or more discs 46 positioned within the sensor's field of view 82. For instance, the distance sensor(s) 80 may be configured to measure the distance between the sensor 80 and a given reference location defined on each respective disc 46 positioned within the sensor's field of view 82, such as a reference location defined at a given position along the outer circumference or perimeter of each disc 46 (e.g., at a given location along the cutting or working edge of each disc 46). As a result, the distance sensor(s) 80 may be configured to detect when a change or variation in the measured distance occurs between the sensor(s) 80 and the reference location on a given disc 46. As will be described in greater detail below, such detected changes or variations in the measured distance may be analyzed to identify instances in which a disc has been damaged or is missing.

In several embodiments, each distance sensor 80 may have a field of view 82 that encompasses one or more disc gang assemblies 44 of the implement 10. As an example, as shown in FIG. 2, a front distance sensor 80A is supported at the front end 30 of the implement 10 (e.g., by being mounted to a portion of the hitch assembly 40) such that the first distance sensor 80A has a field of view 82 that encompasses both of the front disc gang assemblies 44AL, 44AR. However, in other embodiments, a separate distance sensor may be used for each disc gang assembly 44. For instance, as shown in FIG. 2, separate rear distance sensors 80B, 80C are coupled to or supported relative to portions of the frame 28 such that each rear distance sensor 80B, 80C has a field of view 82 encompassing a respective rear disc gang assembly 44BL, 44BR of the implement 10. Alternatively, each distance sensor 80 may have a field of view 82 that only encompasses a portion of the discs 46 of a given disc gang assembly 44, in which case two or more distance sensors 80 may be required to provide sensor-to-disc distance-related data associated with all of the discs 46 of a given disc assembly 44. For instance, as will be described below with reference to FIG. 3, in one embodiment, individual distance sensors 80 may be provided in association with each respective disc 46 to provide data associated with the sensor-to-disc distance for each of such discs.

It should be appreciated that, in general, each distance sensor 80 may correspond to any suitable sensor or sensing device that is configured to generate data associated with a distance defined between the sensor 80 and one or more discs 46 contained within the sensor's field of view 82. For instance, in several embodiments, each distance sensor 80 may correspond to a non-contact sensor, such as a camera, LIDAR device, proximity sensor, or any other suitable non-contact sensor (e.g., including other suitable vision-based sensors). Depending on the sensor technology, various different fields of view 82 may be achievable, which may impact the number of distance sensors 80 installed relative to the implement 10. For instance, certain vision-based sensors, such as cameras and LIDAR devices, may have relatively wide fields of view that allow each sensor to monitor the individual sensor-to-disc distances of a larger number of discs 46, such as the sensors 80A, 80B, 80C described above that are configured to capture sensor-to-disc distance-related data associated with the discs 46 of one or more disc gang assemblies 44. However, other sensor technologies, such as proximity sensors, may have a relatively narrow field of view (including a single-point field of view) such that each sensor is only configured to capture sensor-to-disc distance-related data associated with a single disc.

Figure 3:
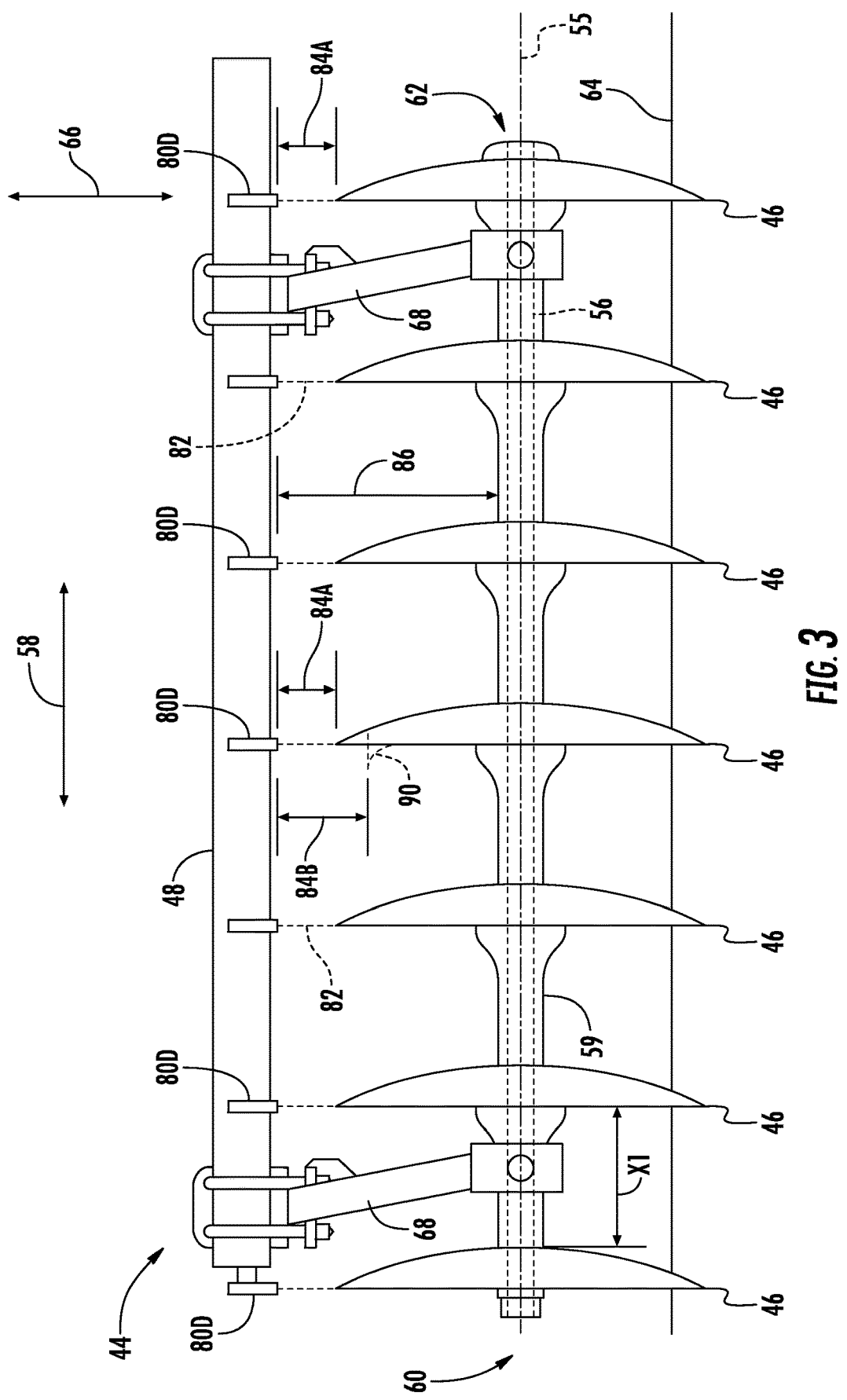
FIG. 3 illustrates a font view of one of the disc gang assemblies of the implement 10 shown in FIGS. 1 and 2, particularly illustrating another embodiment of distance sensors installed relative the disc gang assembly for monitoring sensor-to-disc distances between each sensor and one or more discs of the disc gang assembly.

Referring now to FIG. 3, a front view of one of the disc gang assemblies 44 described above with reference to FIGS. 1 and 2 is illustrated in accordance with aspects of the present subject matter. As shown in FIG. 3, the disc gang assembly 44 may include a disc gang shaft (e.g., as indicated with dashed lines 56) that extends along an axial direction of the disc gang assembly 44 (e.g., as indicated by arrow 58) between a first end 60 and a second end 62. The disc gang shaft 56 may be positioned below the toolbar 48 of the disc gang assembly 44 along a vertical direction (e.g., as indicated by arrow 66) of the implement 10 and supported relative to the toolbar 48 by one or more hangers 68. However, in alternative embodiments, the disc gang shaft 56 may have any other suitable orientation. Each disc 46 may be rotatably coupled or keyed to the disc gang shaft 56. The disc gang shaft 56 defines a rotational axis (e.g., as indicated by dashed line 55) about which the discs 46 rotate. Each disc 46 may be spaced apart from an adjacent disc 46 in the axial direction 58 via spools 59 by a distance X1. As is generally understood, the discs 46 may be configured to penetrate through a soil surface 64 of the field and cut into the ground during the performance of an agricultural operation.

Additionally, FIG. 3 also illustrates another embodiment of suitable distance sensors 80 that can be used to generate data related to sensor-to-disc distances in accordance with aspects of the present subject matter. As shown, unlike the embodiments of the sensors 80 shown in FIG. 2, the distance sensors 80D have limited or narrow fields of view 82 such that each distance sensor 80D is configured to monitor a sensor-to-disc distance 84 defined between itself and a single disc 46. Specifically, in the illustrated embodiment, a plurality of distance sensors 80D are mounted to and spaced apart along the toolbar 48 such that each distance sensor 80D is positioned directly above a respective disc 46. As indicated above, each distance sensor 80B may be configured to monitor an associated sensor-to-disc distance 84 defined between the sensor 80D and a given reference location on the disc 46. For instance, as shown in FIG. 3, each distance sensor 80B is configured to monitor a sensor-to-disc distance 84 defined between the sensor 80B and a given location along the outer perimeter or circumference of the disc 46, such as at a given location along a cutting or working edge of the disc 46. However, in other embodiments, the reference disc location for monitoring the sensor-to-disc distance 84 may be defined at any other suitable location on the disc 46 that provides a suitable measurement location.

As will be described in greater detail below with reference to FIG. 4, the monitored sensor-to-disc distances 84 may be analyzed to identify or infer the operating condition of each respective disc 46. For instance, in certain instances, a disc 46 may become damaged, such as broken or bent, at one or more locations along its outer circumference or perimeter. In such instances, the sensor-to-disc distance 84 measured by the distance sensor 80 will increase as the damaged portion of the disc 46 is rotated through the field of view 82 of the sensor 80 due to the bent or broken nature of the disc 46. As a result, the data trace of the measured distances over time will generally exhibit a repeating or cyclical pattern as the non-damaged and damaged portions of the disc 46 pass through the sensor's field of view 82. For instance, FIG. 3 illustrates schematically a damaged portion 90 (indicated in dashed lines) of a disc 46 across which the disc 46 is bent or broken such that the disc 46 is out-of-round along the damaged portion 90 relative to the remainder of the outer circumference or perimeter of the disc 46. As a result, when the damaged portion 90 of the disc 46 rotates through the respective sensor's field of view 82, the sensor 80D will detect an increased sensor-to-disc distance 84B as compared to the sensor-to-disc distance 84A detected along the remaining, non-damaged portions of the disc 46.

Additionally, the monitored sensor-to-disc distances 84 may also be analyzed to identify or infer when a disc 46 is missing, such as when a disc 46 has broken or fallen off its associated disc gang assembly 44. In such instance, the corresponding distance measured by the distance sensor 80 may, for example, increase significantly over a relatively short period of time and then remain at such increased distance indefinitely. For instance, in the illustrated embodiment of FIG. 3, when one of the discs 46 falls off, the measured distance may increase abruptly from the normal or expected sensor-to-disc distance 84A to a significantly increased distance, such as a distance defined between the sensor 80D and the adjacent spindle 59 or shaft 56 (e.g., distance 86) or a distance defined between the sensor 80D and the soil surface 64 (e.g., depending on the orientation of the field of view 82 of the sensor 80D). Such an abrupt increase in the measured distance, followed by the measured distance remaining relatively constant at the increased distance value, may generally be indicative of a missing disc.

Figure 4:
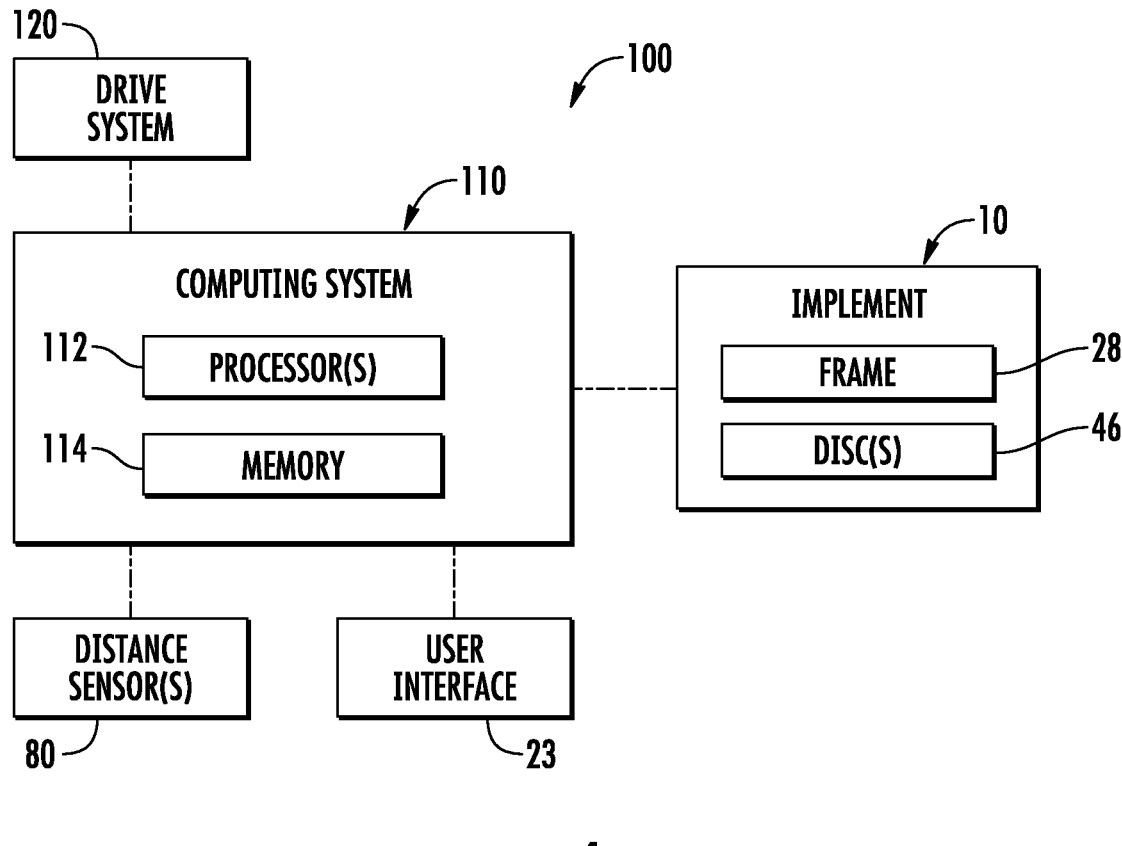
FIG. 4 illustrates a schematic view of one embodiment of a system for monitoring disc conditions of an agricultural implement in accordance with aspects of the present subject matter.

Referring now to FIG. 4, a schematic view of one embodiment of a system 100 for monitoring the disc conditions of an agricultural implement is illustrated in accordance with aspects of the present subject matter. In general, the system 100 will be described herein with reference to the implement 10 and related discs 46 described above with reference to FIGS. 1-3. However, it should be appreciated by those of ordinary skill in the art that the disclosed system 100 may generally be utilized with agricultural implements having any other suitable implement configuration and/or with discs having any other suitable disc configuration (including individually mounted or non-ganged discs).

In general, the system 100 may include an agricultural implement and/or one or more components of an agricultural implement, such as the agricultural implement 10 described above and/or one or more of its components. For example, as shown in FIG. 4, the system 100 may include one or more discs 46 configured to be supported relative to a frame 28 of the implement 10, such as the discs 46 of one or more of the front disc gang assemblies 44AL, 44AR and/or one or more of the rear disc gang assemblies 44BL, 44BR of the implement 10 described above. Additionally, the system 100 may include one or more distance sensors 80 configured to generate data indicative of a distance defined between the sensor(s) 80 and one or more discs 46 contained within the sensor's field of view 82. For instance, as described above, each distance sensor 80 may be configured to generate data associated with the sensor-to-disc distance defined between the sensor 80 and a reference location defined relative to one or more of the discs 80 contained within sensor's field of view 82.

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the sensor-to-disc distances of all or a portion of the discs 46 of the implement 10 based on the data received from the distance sensor(s) 80. Specifically, in one embodiment, the computing system 110 may be communicatively coupled to the distance sensor(s) 80 (e.g., via a wired or wireless connection) to allow the distance-related data associated with the measured sensor-to-disc distances to be transmitted to the computing system 110. The monitored sensor-to-disc distances may then be analyzed over time to infer or identify an operating condition of one or more of the discs 46. Specifically, as indicated above, the monitored sensor-to-disc distances may be analyzed to determine when a given disc(s) 46 is damaged (broken or bent) or is completely missing from its expected location.

Figures 5A, 5B, 5C:
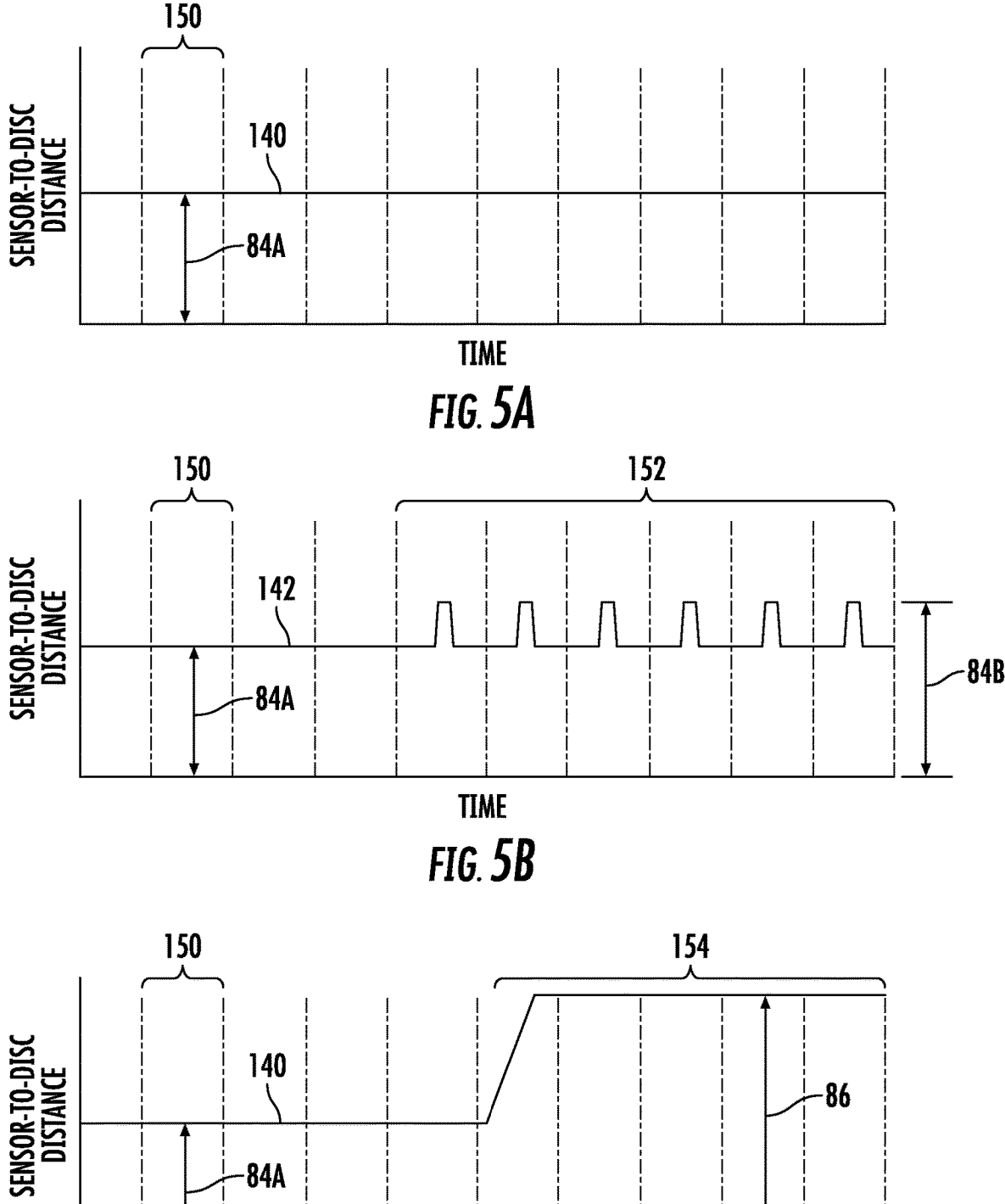
FIG. 5A illustrates an example data graph or trace of measured sensor-to-disc distances over time, particularly illustrating a data trace representative of a disc having a normal or non-damaged operating condition.
FIG. 5B illustrates another example data graph or trace of measured sensor-to-disc distances over time, particularly illustrating a data trace representative of a disc that has transitioned from a normal or non-damaged operating condition to a damaged condition.
FIG. 5C illustrates yet another example data graph or trace of measured sensor-to-disc distances over time, particularly illustrating a data trace representative of a disc that has transitioned from a normal or non-damaged operating condition to a missing condition.

For instance, FIGS. 5A-5C illustrate example data graphs or traces of measured sensor-to-disc distances over time, particularly illustrating a data trace 140 representative of a disc 46 having a normal or non-damaged operating condition (FIG. 5A), a data trace 142 representative of a disc 46 that has transitioned from a normal or non-damaged operating condition to a damaged condition (FIG. 5B), and a data trace 144 representative of a disc 46 that has transitioned from a normal or non-damaged operating condition to a missing condition (FIG. 5C). It should be appreciated that, in each of FIGS. 5A-5C, a time 150 defined between each of the dashed vertical lines generally corresponds to the time required for the associated disc 46 to make one full revolution about its axis of rotation. Thus, each of FIGS. 5A-5C illustrates an example data trace across ten full revolutions of the associated disc 46.

As shown in FIG. 5A, in a non-damaged or normal operating condition, the data trace 140 for the distance-related data provided from the associated distance sensor 80 will generally be characterized by a flat profile having a constant or substantially constant sensor-to-disc distance. For instance, referring back to the embodiment shown in FIG. 3, when the cutting or working edge of the disc 46 has a non-damaged, circular profile, it is expected that the sensor-to-disc distance will remain substantially constant (e.g., at distance 84A) as the disc 46 rotates relative to the sensor 80.

In contrast, as shown in FIG. 5B, when the disc 46 is in a damaged condition (e.g., a portion of the disc 46 is broken or bent), the data trace 142 for the distance-related data provided from the associated distance sensor 80 will generally exhibit a damage pattern characterized by a repeating or cyclical variation in the monitored distance over time. Specifically, in the illustrated embodiment, the data trace 142 transitions from a flat profile having a constant or substantially constant sensor-to-disc distance (e.g., distance 84A) to a damage pattern (e.g., across time period 152) characterized by repeating or cyclical increases in the sensor-to-disc distance (e.g., an increase to distance 84B) relative to the expected or baseline sensor-to-disc distance (e.g., distance 84A), thereby indicating that the disc 46 has transitioned from a normal or non-damaged operating condition to a damaged condition. For instance, referring back to the embodiment shown in FIG. 3, the cyclical increases or spikes in the data trace 142 may correspond to each time period across which the damaged portion 90 of the disc 46 rotates through the field of view 82 of the sensor 80. As a result, during such time periods, the sensor 80 will measure an increased sensor-to-disc distance between itself and the disc 46 due to the damaged nature of the disc 46. However, upon the damaged portion 90 of the disc 46 passing through the sensor's field of view 82, the sensor-to-disc distance may, for example, return back to the expected or baseline sensor-to-disc distance (e.g., distance 84A) until the damaged portion 90 of the disc 46 once again passes through the sensor's field of view 82, thereby creating the repeating or cyclical damage pattern shown in FIG. 5B.

As another example, as shown in FIG. 5C, when the disc 46 suddenly goes missing (e.g., the disc 46 breaks or falls off), the data trace 144 for the distance-related data provided from the associated distance sensor 80 will generally exhibit a missing disc pattern characterized by an abrupt change in the measured distance from the baseline or expected distance to a significantly increased distance, followed by the measured distance remaining relatively constant at the increased distance value. Specifically, in the illustrated embodiment, the data trace 144 transitions from a flat profile having a constant or substantially constant sensor-to-disc distance (e.g., distance 84A) to a missing disc pattern (e.g., across time period 154) characterized by a substantial increase in the measured distance (e.g., an increase to distance 86) relative to the expected or baseline sensor-to-disc distance (e.g., distance 84A) followed by the measured distance being generally maintained at the increased distance 86, thereby indicating that the disc 46 has transitioned from a normal or non-damaged operating condition to a missing disc condition.

It should be appreciated that, to identify a missing disc condition, the increased distance value measured by the distance sensor 80 may be compared to a predetermined distance threshold. In one embodiment, the predetermined distance threshold may correspond to a distance value at which it is not anticipated that the disc 46 is still present within the field of view 82 of the distance sensor 80. For instance, referring back to the embodiment shown in FIG. 3, an increase in the measured distance to a distance value corresponding to the distance defined between the sensor 80D and the spindle 59 or gang shaft 56 (e.g., distance 86) would likely indicate that the disc 46 is missing from the shaft 56. In such an embodiment, the predetermined distance threshold may, for example, be set as a percentage or function of the distance defined between the sensor 80D and the spindle 59 or gang shaft 56 (e.g., 90%, 95%, of 100% of such distance).

Referring back to FIG. 4, as indicated above, the computing system 110 may be configured to monitor the sensor-to-disc distances to identify when one or more of the discs 46 is experiencing a damaged condition or is currently missing. Moreover, when it is determined that a given disc 46 is damaged or missing, the computing system 110 may be configured to automatically initiate one or more control actions. For example, the computing system 110 may be configured to provide the operator with a notification that a given disc 46 is damaged or missing. Specifically, in one embodiment, the computing system 110 may be communicatively coupled to the user interface 23 of the work vehicle 12 via a wired or wireless connection to allow notification signals to be transmitted from the computing system 100 to the user interface 23. In such an embodiment, the notification signals may cause the user interface 23 to present a notification to the operator (e.g., by causing a visual or audible notification or indicator to be presented to the operator) which provides an indication of the operational status of the disc 46 (e.g., as damaged or missing). In such instance, the operator may then choose to initiate any suitable corrective action he/she believes is necessary, such as adjusting the ground speed of the implement 10 (including bringing the implement to a stop).

Additionally, in several embodiments, the control action(s) executed by the computing system 110 may include automatically adjusting the operation of the implement 10 and/or the associated work vehicle 12. For instance, in one embodiment, the computing system 110 may be configured to automatically adjust the ground speed of the implement 10 in response to determining that a disc 46 is damaged or missing, such as by actively controlling a drive system 120 of the work vehicle 12 (e.g., the engine 24 and/or the transmission 26 of the work vehicle 12) to safely bring the vehicle/implement to a stop.

Referring now to FIG. 6, a flow diagram of one embodiment of a method 200 for monitoring disc conditions of an agricultural implement is illustrated in accordance with aspects of the present subject matter. In general, the method 200 will be described herein with reference to the agricultural implement 10, discs 46, and system 100 described above with reference to FIGS. 1-4. However, it should be appreciated by those of ordinary skill in the art that the disclosed method 200 may generally be utilized in association with agricultural implements having any suitable implement configuration, discs having any other suitable disc configuration, and/or systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving data from a distance sensor that is associated with a monitored distance defined between the distance sensor and a disc of an agricultural implement. For instance, as indicated above, the computing system 110 may be communicatively coupled to one or more associated distance sensors 80, thereby allowing the computing system 110 to receive data associated with the sensor-to-disc distances defined between each sensor 80 and one or more respective discs 46.

Additionally, at (204), the method 200 may include detecting a pattern in the monitored distance over time that is associated with at least one of a damage pattern or a missing disc pattern. Specifically, as indicated above, the computing system 110 may be configured to analyze the distance-related data to identify patterns within the data over time, including damage patterns and/or missing disc patterns. For instance, a damage pattern may be characterized by a cyclical variation in the monitored distance over time, while a missing disc pattern may be characterized by the monitored distance increasing beyond a distance threshold at which it is not anticipated that the disc 46 is still present within the field of view 82 of the distance sensor 80.

Moreover, at (206), the method 200 may include initiating a control action following the detection of the pattern. For instance, as indicated above, upon the detection of a damage pattern or a missing disc pattern, the computing system 110 may be configured to initiate a control action, such as by generating an operator notification or by adjusting the operation of the implement 10.

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring disc conditions of an agricultural implement, the system comprising:
   a disc configured to penetrate through a soil surface during the performance of an agricultural operation;
   a distance sensor configured to generate data associated with a distance defined between the distance sensor and a portion of the disc;
   a computing system communicatively coupled with the distance sensor, the computing system being configured to:
      monitor the distance defined between the distance sensor and the disc based on the data received from the distance sensor; and
      detect a pattern in the monitored distance over time that is associated with at least one of a damage pattern or a missing disc pattern,
      wherein the damage pattern is indicative of a damaged condition of the disc and is characterized by a cyclical variation in the monitored distance over time; and
      wherein the missing disc pattern is indicative of the disc no longer being present within a field of view of the distance sensor and is characterized by the monitored distance increasing beyond a distance threshold at which it is anticipated that the disc has become decoupled from the agricultural implement.

2. The system of claim 1, wherein the pattern detected by the computing system is associated with the damage pattern.

3. The system of claim 2, wherein the damaged condition of the disc results in an increase in the distance defined between the distance sensor and the disc as a damaged portion of the disc is rotated into the field of view of the distance sensor and a return to an expected distance defined between the distance sensor and the disc as the damaged portion of the disc is rotated out of the field of view of the distance sensor such that the damage pattern is characterized by cyclical increases in the monitored distance over time.

4. The system of claim 1, wherein the distance sensor comprises at least one non-contact sensor.

5. The system of claim 1, wherein the computing system is configured to initiate a control action when the detected pattern is associated with the at least one of the damage pattern or the missing disc pattern.

6. The system of claim 1, wherein the distance threshold is selected based on a distance defined between the distance sensor and a spindle or a gang shaft of the agricultural implement.

7. A system for monitoring disc conditions of agricultural implements, the system comprising:

an agricultural implement configured to perform an agricultural operation, the agricultural implement including a frame and a plurality of discs supported relative to the frame;
a distance sensor supported relative to the agricultural implement and being configured to generate data associated with a distance defined between the distance sensor and a portion of at least one disc of the plurality of discs;
a computing system communicatively coupled with the distance sensor, the computing system being configured to:
   monitor the distance defined between the distance sensor and the at least one disc based on the data received from the distance sensor; and
   detect a pattern in the monitored distance over time that is associated with at least one of a damage pattern or a missing disc pattern,
wherein the damage pattern is indicative of a damaged condition of the at least one disc and is characterized by a cyclical variation in the monitored distance over time; and
wherein the missing disc pattern is indicative of the at least one disc no longer being present within a field of view of the distance sensor and is characterized by the monitored distance increasing beyond a distance threshold at which it is anticipated that the disc has become decoupled from the agricultural implement.

8. The system of claim 7, wherein the plurality of discs form part of a disc gang assembly of the agricultural implement, and wherein the field of view of the distance sensor includes two or more discs of the disc gang assembly.

9. The system of claim 7, wherein the pattern detected by the computing system is associated with the damage pattern.

10. The system of claim 9, wherein the damaged condition of the at least one disc results in an increase in the distance defined between the distance sensor and the at least one disc as a damaged portion of the at least one disc is rotated into the field of view of the distance sensor and a return to an expected distance defined between the distance sensor and the disc as the damaged portion of the disc is rotated out of the field of view of the distance sensor such that the damage pattern is characterized by cyclical increases in the monitored distance over time.

11. The system of claim 7, wherein the distance sensor comprises at least one non-contact sensor.

12. The system of claim 7, wherein the computing system is configured to initiate a control action when the detected pattern is associated with the at least one of the damage pattern or the missing disc pattern.

13. The system of claim 12, wherein the control action comprises generating a notification for an operator of the agricultural implement.

14. The system of claim 12, wherein the control action comprises adjusting an operation of the agricultural implement.

15. The system of claim 7, wherein the distance threshold is selected based on a distance defined between the distance sensor and a spindle or a gang shaft of the agricultural implement.

16. A method for monitoring disc conditions of an agricultural implement, the method comprising:
   receiving, with a computing system, data from a distance sensor that is associated with a monitored distance defined between the distance sensor and a disc of the agricultural implement, the disc being configured to penetrate through a soil surface during the performance of an agricultural operation;

detecting, with the computing system, a pattern in the monitored distance over time that is associated with at least one of a damage pattern or a missing disc pattern, the damage pattern being indicative of a damaged condition of the disc and being characterized by a cyclical variation in the monitored distance over time, the missing disc pattern being indicative of the at least one disc no longer being present within a field of view of the distance sensor and is characterized by the monitored distance increasing beyond a distance threshold at which it is anticipated that the disc has become decoupled from the agricultural implement; and initiating, with the computing system, a control action following the detection of the pattern.

17. The method of claim 16, wherein detecting the pattern in the monitored distance over time comprises detecting the damage pattern, the damage pattern wherein the damaged condition of the disc results in an increase in the distance defined between the distance sensor and the disc as a damaged portion of the disc is rotated into the field of view of the distance sensor and a return to an expected distance defined between the distance sensor and the disc as the damaged portion of the disc is rotated out of the field of view of the distance sensor such that the damage pattern is characterized by cyclical increases in the monitored distance over time.

18. The method of claim 16, wherein initiating the control action comprises generating a notification for an operator of the agricultural implement.

19. The method of claim 16, wherein initiating the control action comprises adjusting an operation of the agricultural implement.

20. The method of claim 16, wherein detecting the pattern in the monitored distance over time comprises detecting the missing disc pattern, wherein the distance threshold is selected based on a distance defined between the distance sensor and a spindle or a gang shaft of the agricultural implement.

* * * * *